United States Patent
Heo et al.

(10) Patent No.: US 7,655,352 B2
(45) Date of Patent: Feb. 2, 2010

(54) BATTERY PACK CASE

(75) Inventors: Sang-Do Heo, Youngin-si (KR); In-Han Kim, Youngin-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 752 days.

(21) Appl. No.: 11/232,433

(22) Filed: Sep. 22, 2005

(65) Prior Publication Data

US 2006/0073384 A1    Apr. 6, 2006

(30) Foreign Application Priority Data

Sep. 22, 2004    (KR) ............... 10-2004-0076142

(51) Int. Cl.
- H01M 2/00 (2006.01)
- H01M 6/46 (2006.01)
- H01M 2/04 (2006.01)
- H01M 2/10 (2006.01)

(52) U.S. Cl. ............... 429/163; 429/162; 429/176; 429/96

(58) Field of Classification Search ............... 429/164, 429/163

See application file for complete search history.

(56) References Cited

U.S. PATENT DOCUMENTS 6,881,371 B2 *   4/2005   Iwaizono et al. ............ 264/261

2001/0052710 A1 *  12/2001  Witherell ............... 294/137
2003/0180582 A1 *  9/2003   Masumoto et al. ........ 429/7
2004/0091769 A1 *  5/2004   Kawabata et al. ........ 429/163
2005/0181242 A1 *  8/2005   Suzuki et al. ............ 429/7

FOREIGN PATENT DOCUMENTS

| JP | 2005166644 A | * | 6/2005 |
| KR | 10-2004-0015314 | | 2/2004 |
| KR | 10-2004-0081012 | | 9/2004 |

OTHER PUBLICATIONS

U.S. Patent Application Serial No. (to be assigned) by Sang-Do Heo et al., entitled *Battery Pack and its Method of Manufacture*, filed concurrently with the present application.

* cited by examiner

*Primary Examiner*—Dah-Wei D Yuan
*Assistant Examiner*—Adam A Arciero
(74) *Attorney, Agent, or Firm*—Robert E. Bushnell, Esq.

(57) ABSTRACT

A battery pack case adapted to enclose a protective circuit module and a bare cell includes at least one small opening arranged on a side to expose an external terminal of the protective circuit module and a large opening arranged in the opposite direction to the small opening to expose a surface of the bare cell. Since a bare cell and a protective circuit module are contained within an integral case, the bare cell is prevented from escaping out of the protective circuit module and no separate resin is necessary to fill the gap between the bare cell and the protective circuit module. In addition, the battery pack case has gates, through which a resin is injected, which are properly arrayed in such a manner during resin injection that the case has no unshaped part.

7 Claims, 5 Drawing Sheets

BATTERY PACK CASE

CLAIM OF PRIORITY

This application makes reference to, incorporates the same herein, and claims all benefits accruing under 35 U.S.C. §119 from an application for BATTERY PACK CASE earlier filed in the Korean Intellectual Property Office on 22 Sep. 2004 and there duly assigned Serial No. 2004-0076142.

BACKGROUND OF THE INVENTION

1. Field of the Invention

The present invention relates to a battery pack case, and more particularly to a battery pack case having a protective circuit module adapted to avoid escaping out of a bare cell and gates properly arrayed in such a manner that, when forming the case, it has no unshaped part.

2. Description of the Related Art

In general, a battery pack includes a chargeable/dischargeable bare cell, a protective circuit module electrically connected to the bare cell to control charging/discharging and to interrupt the current in case of overcharging/over-discharging, a resin filling a gap between the bare cell and the protective circuit module to prevent the protective circuit module from detaching from the bare cell, and a case containing the bare cell, the protective circuit module, and the resin therein.

A method of manufacturing a battery pack includes: electrically connecting a lead to the positive electrode of the bare cell and electrically connecting a PTC thermistor to the negative electrode thereof. The protective circuit module is again electrically connected to the lead and the PTC thermistor. A gap between the protective circuit module and the bare cell is filled with a resin to mechanically attach them so that the protective circuit module does not detach from the bare cell. The bare cell, the protective circuit module, and the like are contained within a case. The case is integrally molded using another resin together with the bare cell, the protective circuit module, and the resin. Alternatively, upper and lower cases are separately provided and, after placing the bare cell and the protective circuit module between them, are attached together.

However, such a battery pack has a problem in that, since a gap can be created between the bare cell and the protective circuit module even after placing them within the case or since they can detach from each other, a resin must be used to fill the gap between the bare cell and the protective circuit module in a difficult process to attach them to each other. During the resin filling process, various electronic components on the protective circuit module can be easily damaged and the lead and the PTC thermistor, which have previously been connected to each other, can detach from each other.

The PTC thermistor increases its resistance value when the temperature reaches about 70-80° C. and interrupts the current flowing through the circuit. Once it is actuated, its resistance value does not drop to the exact original value or the device characteristics degrade, even when the temperature returns to a normal range. Since the resin has a temperature of about 150° C. when filling the gap between the bare cell and the protective circuit module, the PTC thermistor is very likely to be actuated and degrade its characteristics.

In order to solve this problem, the PTC thermistor can be arranged on the outer periphery of the bare cell rather than between the bare cell and the protective circuit module. Then, the PTC thermistor is exposed to the danger of colliding with other objects and being damaged by them during manufacturing processes. The thickness of the PTC thermistor must also be taken into account when manufacturing the case. This makes the manufacturing processes complicated and increases cost.

In addition, a separate mold is necessary to fill the gap between the protective circuit module and the bare cell with a resin. This further increases the manufacturing cost of the battery pack and, as the processes become more complicated, the defect ratio increases.

SUMMARY OF THE INVENTION

Accordingly, the present invention has been made to solve the above-mentioned problems occurring, and an object of the present invention is to provide a battery pack case having a protective circuit module adapted to avoid detaching from a bare cell when they are integrally contained within the case.

Another object of the present invention is to provide a battery pack case having gates, through which a resin is injected, properly arrayed in such a manner that, when manufacturing the case to which a bare cell and a protective circuit module are contained within, it has no unshaped part.

In order to accomplish these objects, a battery pack case adapted to enclose a protective circuit module and a bare cell is provided, the case including: at least one small opening arranged on a side to expose an external terminal of the protective circuit module; and a large opening arranged in the opposite direction to the small opening to expose a surface of the bare cell.

The battery pack case preferably further includes at least one gate trace arranged adjacent to the small opening.

The battery pack case preferably further includes at least one gate trace respectively arranged above and below the small opening, the upper and lower gate traces being positioned on different straight lines in the vertical direction.

The battery pack case preferably further includes: long-sided regions spaced apart from each other; short-sided regions arranged on edges of the long-sided regions while being spaced apart from each other; and an upper-sided region arranged on common edges of the long-sided regions and the short-sided regions, the small opening being arranged in the upper-sided region.

The interface between the long-sided regions and the short-sided regions preferably is rounded. The interface between the long-sided regions and the short-sided regions is alternatively preferably at a right angle.

The battery pack case preferably further includes at least one gate trace arranged in the upper-sided region outside the small opening.

At least one gate trace is preferably respectively arranged adjacent to the lower long-sided region and adjacent to the upper long-sided region, the upper and lower gate traces being positioned on different straight lines in a vertical direction.

The upper and lower gate traces are preferably arranged in a zigzag pattern.

The case preferably includes an insulating resin. The case preferably includes one material chosen from a group consisting of PolyCarbonate (PC), PolyEthylene Terephthalate Glycol (PETG), PolyEthylene (PE), PolyPropylene (PP).

The long-sided regions preferably have a rougher surface than that of the short-sided regions.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 1b is a sectional view taken along line 1-1 of FIG. 1a;

FIG. 2b is an exploded perspective view of the battery pack case of FIG. 2a;

FIG. 3b is a sectional view taken along line 3b-3b of FIG. 3a; and

FIG. 3c is a sectional view taken along line 3c-3c of FIG. 3a.

DETAILED DESCRIPTION OF THE INVENTION

Figure 1A:
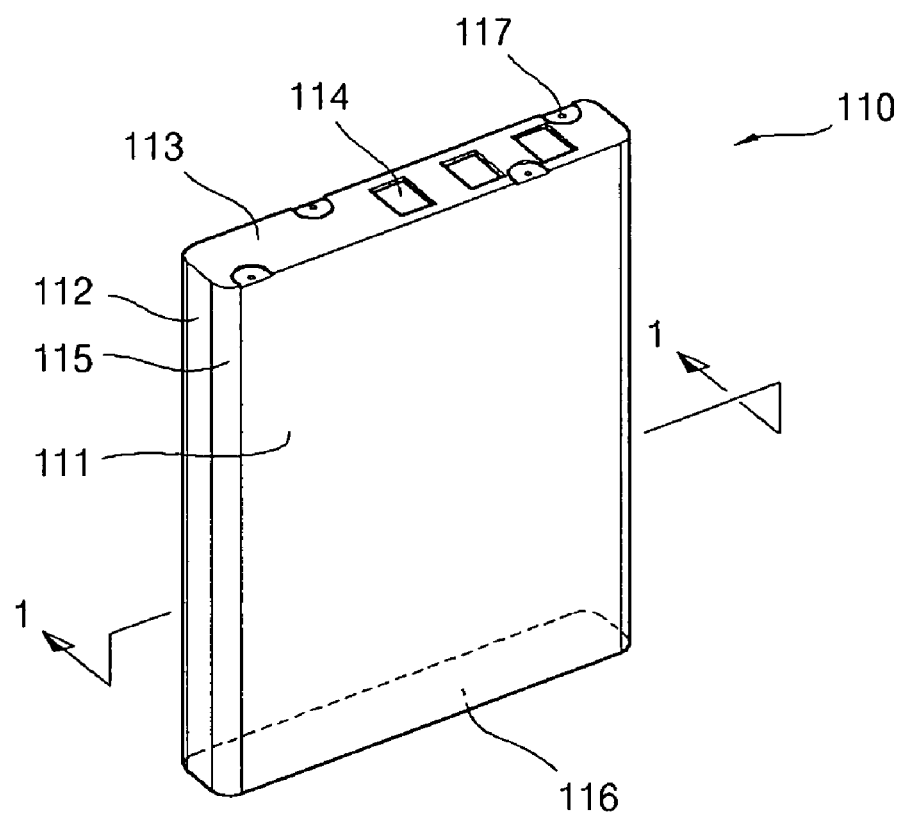
FIG. 1a is a perspective view of a battery pack case according to an embodiment of the present invention.

Hereinafter, an exemplary embodiment of the present invention is described with reference to the accompanying drawings. In the following description and drawings, the same reference numerals are used to designate the same or similar components, and a repetition of the description of the same or similar components has been omitted.

Figure 1B:
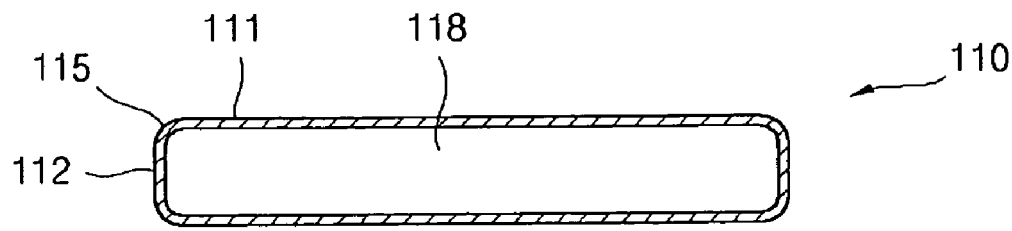

FIG. 1a is a perspective view of a battery pack case according to an embodiment of the present invention and FIG. 1b is a sectional view taken along line 1-1 of FIG. 1a.

As shown, a battery pack case 110 according to the present invention includes long-sided regions 111 facing each other, short-sided regions 112 facing each other, and an upper-sided region 113 closing the space between the long-sided regions 111 and the short-sided regions 112.

The long-sided regions 111 are spaced apart from each other and have an area greater than that of the short-sided regions 112.

The short-sided regions 112 are spaced apart from each other and have an area smaller than that of the long-sided regions 111. The short-sided regions 112 are positioned on both edges of the long-sided regions 111 and define a hollow 118 inside the long-sided regions 111 and the short-sided regions 112. A bare cell, a protective circuit module, and the like are arranged within the hollow 118 during manufacturing processes of the battery pack.

The upper-sided region 113 is positioned on the common edges of the long-sided regions 111 and the short-sided regions 112. The upper-sided region 113 closes a side of the hollow 118 defined by the long-sided regions 111 and the short-sided regions 112. The upper-sided region 113 has at least one small opening 114 formed therein. Although three small openings 114 are shown in the drawing, the present invention is not limited to this number of openings. A large opening 116 is arranged opposite to the small opening 114 so that a bare cell, a protective circuit module, and the like can be passed therethrough at a later time.

A protective circuit module is arranged within the interior of the upper-sided region 113, particularly in the hollow 118, during manufacturing processes of the battery pack with an external terminal formed on the protective circuit module exposed to the exterior via the small opening 114. A bare cell, which is integral with the protective circuit module, is also arranged within the hollow 118. Since the bare cell always forces the protective circuit module against the upper-sided region 113, the bare cell and the protective circuit module are in contact with each other. Therefore, the protective circuit module remains stationary with a predetermined spacing from the bare cell. Although a surface of the bare cell is exposed to the exterior via the large opening 116 formed on the case 110 during manufacturing processes, the exposed part is covered with a resin. Consequently, the protective circuit module and the bare cell are completely fixed and protected inside the case 110.

The upper-sided region 113 has at least one gate trace 117 formed thereon. As used herein, the gate trace 117 refers to the trace of a conduit through which a resin is injected to shape the case 110. Referring to the drawing, at least one gate trace 117 is respectively formed adjacent to the upper long-sided region 111 and adjacent to the lower long-sided region 111. The upper and lower gate traces 117 are not positioned on the same straight line approximately perpendicular to the periphery of the long-sided region 111. In other words, they are positioned on different straight lines.

For example, two gate traces 117 are formed adjacent to the upper long-sided region 111 outside the small opening 114. One of the gate traces 117 is farther away from a short-sided region 112 and the other is closer to the other short-sided region 112. In addition, two gate traces 117 are formed adjacent to the lower long-sided region 111. One of the gate traces 117 is positioned between two small openings 114 and the other is positioned closer to a short-sided region 112. Taking an overall view, the gate traces 117 are arranged in a zigzag pattern in the upper-sided region 113.

Since the gate traces 117 are arrayed in this manner, the case 110 has no incompletely-shaped part when formed. Particularly, if the gate traces 117 are positioned in a line along a parallel line between the long-sided regions 111, a specific part of the long-sided regions 111 or the short-sided regions 112 may not be filled with a resin. This results in poor shaping.

The case 110 can have rounded portions 115 formed at the interface between the long-sided regions 111 and the short-sided regions 112, but this feature is optional in the present invention. Alternatively, the interface between the long-sided regions 111 and the short-sided regions 112 can intersect at a right angle.

The battery pack case 110 according to the present invention is preferably made of an insulating resin. This is because the case 110 directly contacts a protective circuit module and a bare cell and, if it is conductive, a short circuit can occur between circuits. For example, the case 110 can be made of PolyCarbonate (PC), PolyEthylene Terephthalate Glycol (PETG), PolyEthylene (PE), PolyPropylene (PP), or an equivalent thereof. However, the present invention is not limited to these materials.

Figure 2A:
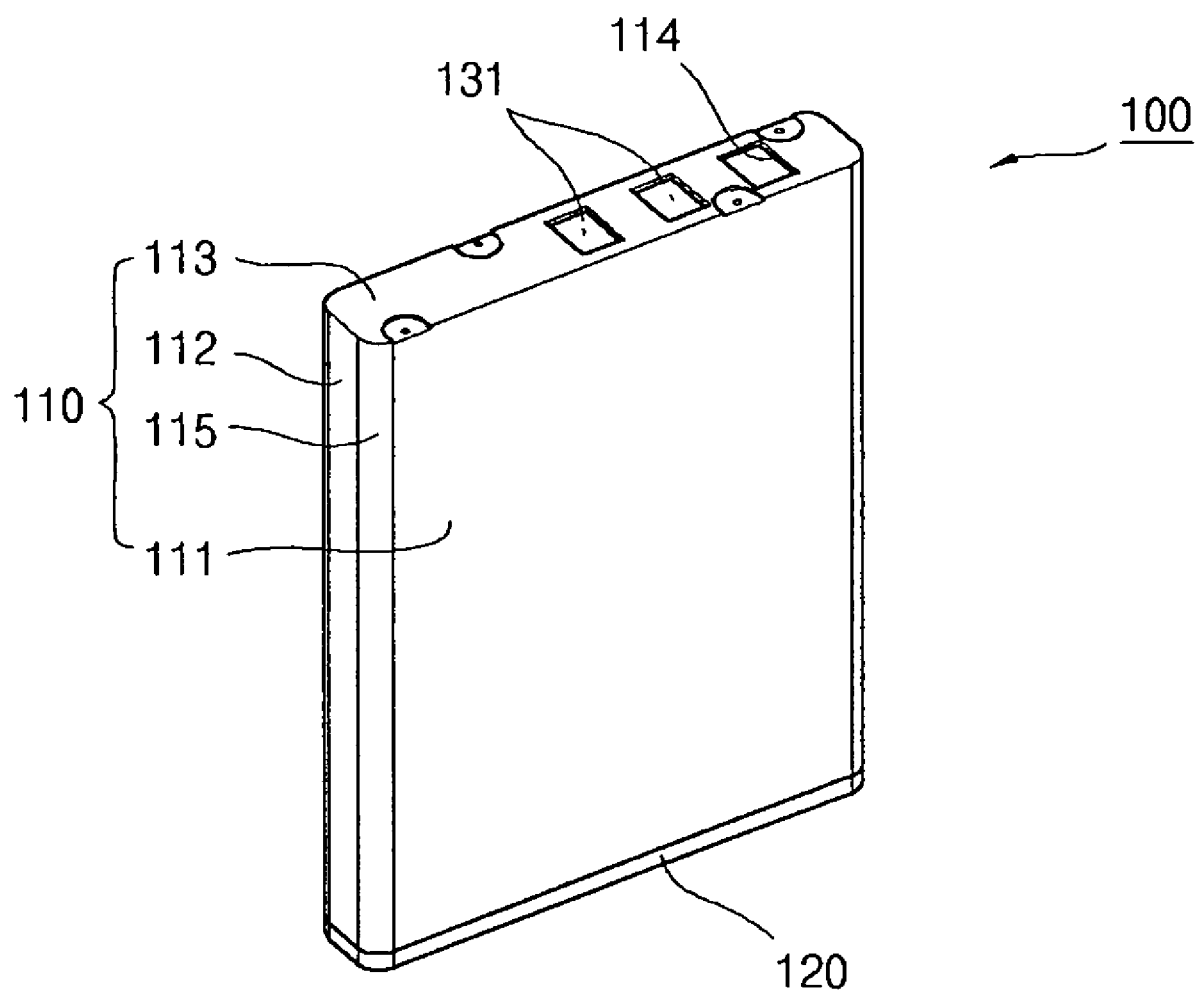
FIG. 2a is a perspective view of a battery pack case according to an embodiment of the present invention in which a bare cell and a protective circuit are contained.
Figure 2B:
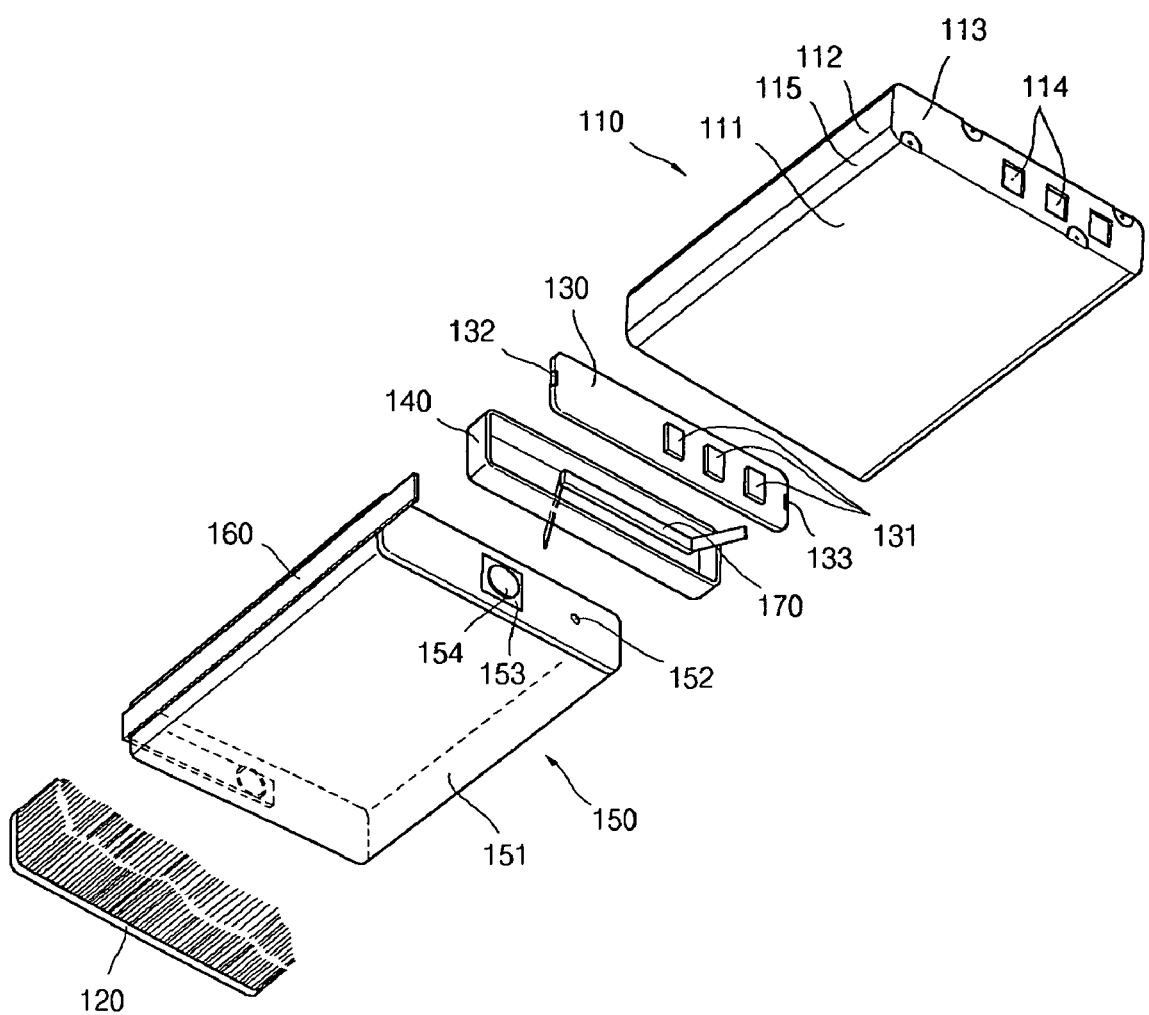

FIG. 2a is a perspective view of a battery pack case according to an embodiment of the present invention in which a bare cell and a protective circuit are contained, and FIG. 2b is an exploded perspective view of the battery pack case of FIG. 2a. The bare cell and the protective circuit module, as will be described later, are just given as an example to help the understanding of the present invention. However, the present invention is not limited to this example.

Referring to FIG. 2a, the exterior of a battery pack 100 is enclosed by an approximately hexahedral case 110. The case 110 includes long-sided regions 111 spaced apart from each other, short-sided regions 112 positioned on the edges of the long-sided regions 111 while being spaced apart from each other, and an upper-sided region 113 positioned on the common edges of the long-sided regions 111 and the short-sided regions 112. The upper-sided region 113 has a number of small openings 114 formed therein.

The lower part of the case 110 is filled with a resin 120 to prevent a bare cell (not shown) and the like positioned therein from escaping to the exterior. The resin 120 can be polyamide, nylon, or an equivalent thereof, which has a melting point of about 150° C. However, the present invention is not limited to these materials.

In the drawing, reference numeral 131 refers to external terminals of a protective circuit module (described later) exposed via the small openings 114 of the upper-sided region 113.

Referring to FIG. 2b, the case 110 has a protective circuit module 130, an insulating ring 140, and a bare cell 150 positioned therein. The protective circuit module 130 and the bare cell 150 are respectively electrically connected to a lead 160 and a PTC thermistor 170.

The protective circuit module 130 has a number of external terminals 131 formed thereon, which are exposed via the small openings 114 of the case 110. The protective circuit module 130 has conductive patterns 132 and 133 formed thereon so that the lead 160 and the PTC thermistor 170 can be connected thereto. The bare cell 150 has an electrode terminal 154, to which the PTC thermistor 170 is connected, a gasket 153 enclosing the electrode terminal 154, and a cap plate 152 to which the electrode terminal 154 and the gasket 153 are attached. The bare cell 150 has a can 151 positioned on the lower portion of the cap plate 152.

Figure 3A:
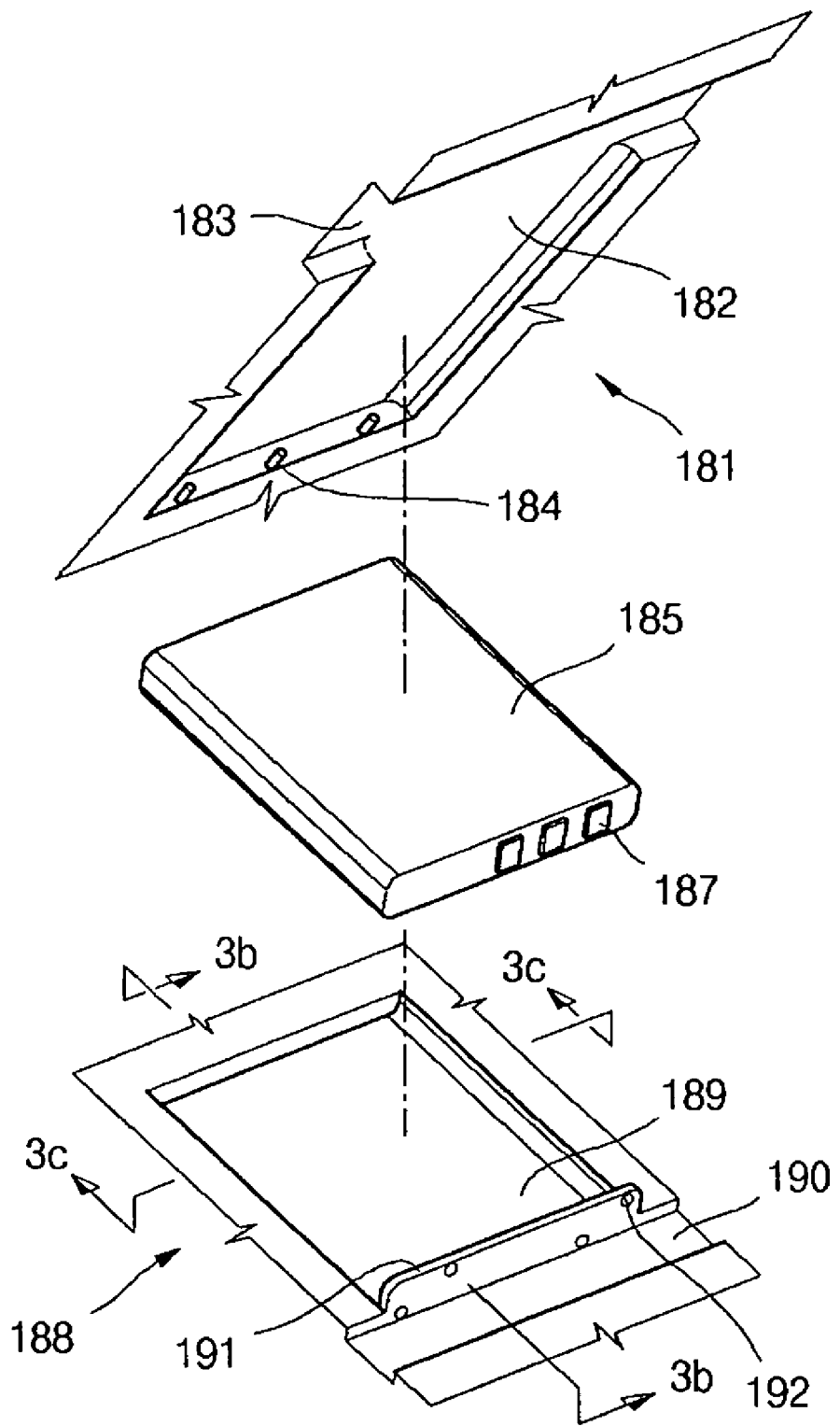
FIG. 3a is an exploded perspective view of the structure of a mold for manufacturing a battery pack case according to an embodiment of the present invention.
Figure 3B:
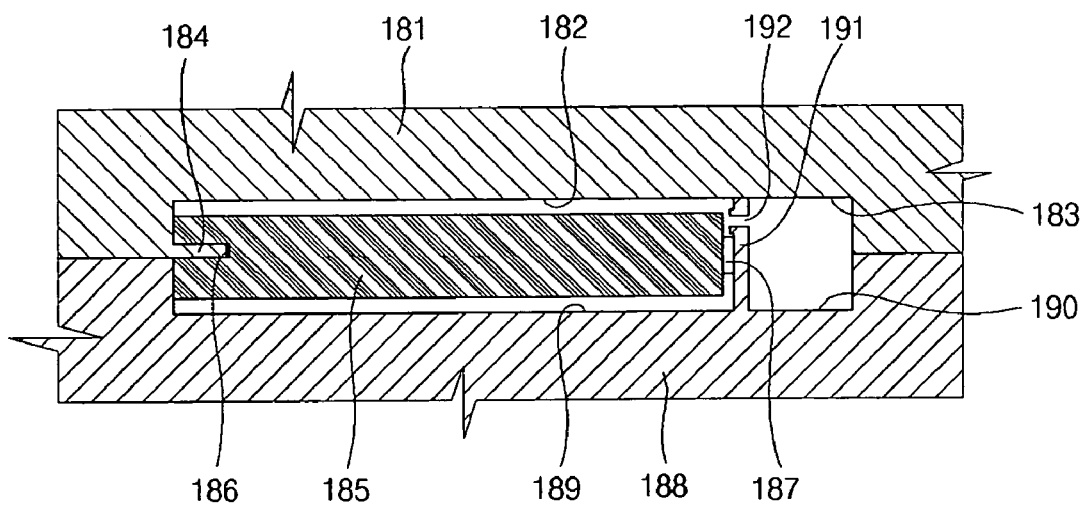
Figure 3C:
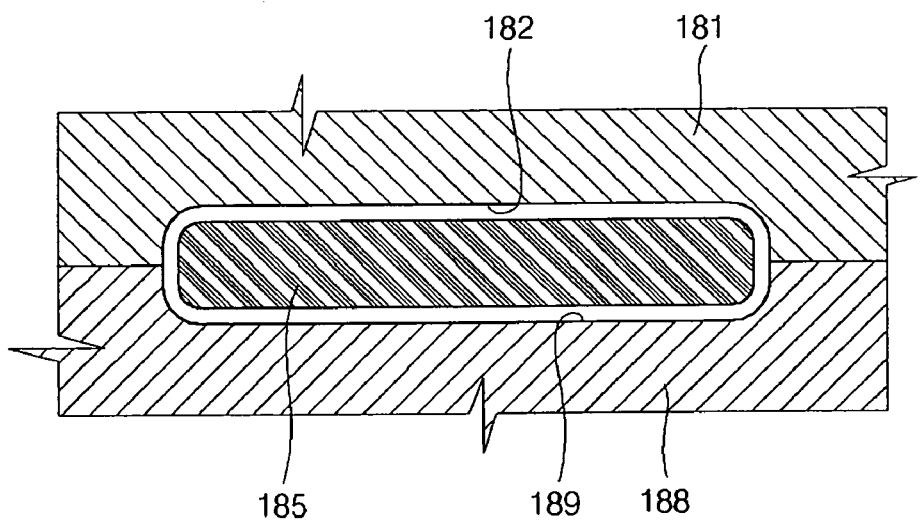

FIG. 3a is an exploded perspective view of the structure of a mold for manufacturing a battery pack case according to an embodiment of the present invention, FIG. 3b is a sectional view taken along line 3b-3b of FIG. 3a, and FIG. 3c is a sectional view taken along line 3c-3c of FIG. 3a.

As shown, an upper mold 181, a hollow-forming body 185, and a lower mold 188 are prepared to manufacture a battery pack case according to the present invention.

The upper mold 181 has a cavity 182, a runner 183, and a protrusion 184 formed on a side thereof to retain the hollow-forming body 185.

The hollow-forming body 185 has a concavity 186 formed on a side thereof, to which the protrusion 184 is attached, and at least one protruding step 187 formed on the other side thereof to provide the case with a small opening. The surface of the hollow-forming body 185 does not contact the cavity 182 formed on the upper mold 181 to provide the case 110 with a long-sided region 111 and a short-sided region 112.

The lower mold 188 has a cavity 189 and a runner 190, as in the case of the upper mold 181. A gate plate 191 is positioned between the cavity 189 and the runner 190 and has a number of gates 192 arrayed thereon to provide the case 110 with a number of gate traces 117. The cavity 189 formed on the lower mold 188 does not contact the hollowing-forming body 185 to provide the case 110 with another long-sided region 111 and another short-sided region 112. The protruding step 187, which is formed on the hollowing-forming body 185 to provide the case 110 with a small opening 114, is fastened to the gate plate 191 while the remaining region does not contact the gate plate 191 to provide the case 110 with an upper-sided region 113.

Regions of the upper and lower molds 181 and 188 corresponding to the long-sides regions 111 of the case 110 are partially etched with a predetermined chemical solution to increase surface roughness and those facing the short-sided regions 112 are processed to be smooth. Although not shown in the drawing, the upper and lower molds 181 and 188 have air vents formed therein.

After preparing the upper mold 181, the hollow-forming body 185, and the lower mold 188, the hollow-forming body 185 is attached to the upper mold 181 and the upper and lower molds 181 and 188 are fastened to each other. Then, an insulating resin having a high temperature and pressure is respectively supplied through the runners 183 and 190 formed on the upper and lower molds 181 and 188.

The resin respectively flows along the gates 192 formed on the gate plate 191 and fills the cavities 182 and 189 formed on the upper and lower molds 181 and 188. Since the gates 192 are evenly arrayed in proper positions, the cavities 182 and 189 of the upper and lower molds 181 and 188 are equally filled and the case 110 has no unshaped part. The hollow-forming body 185 between the upper and lower molds 181 and 188 provides a hollow 118, in which a bare cell and a protective circuit module can be positioned, after shaping of the case 110 has been completed. The hollow-forming body 185 has a number of protruding steps 187 formed thereon and the upper-sided region 118 has a number of corresponding small openings 114 formed thereon. A large opening 116 is naturally formed as the hollow-forming body 185 is fastened to the wall surfaces of the cavities 182 and 189 in the opposite direction to the upper-sided region 113. The upper-sided regions 111 and the short-sided regions 112 of the case 110 are also naturally formed by the gap between the hollow-forming body 185 and the cavities 182 and 189 of the upper and lower molds 181 and 188.

Large surface roughness of the regions of the cavities 182 and 189 of the upper and lower molds 181 and 188 corresponding to the long-sided regions 111 of the case 110 is reflected by large surface roughness of the long-sided regions 111 of the case 110. Therefore, the long-sided regions 111 have high-quality printing including various pictures, characters, figures, and the like. Small surface roughness of the regions of the cavities 182 and 189 corresponding to the short-sided regions 112 of the case 110 makes it easy to remove the case 110 from the molds after shaping is complete.

The battery pack case according to the present invention is advantageous in that, since a bare cell and a protective circuit module are contained within an integral case, the bare cell is prevented from escaping out of the protective circuit module and no separate resin is necessary to fill the gap between the bare cell and the protective circuit module.

In addition, the battery pack case has gates, through which a resin is injected, which are properly arrayed in such a manner during resin injection that the case has no unshaped part.

Although an exemplary embodiment of the present invention has been described for illustrative purposes, those skilled in the art will appreciate that various modifications, additions and substitutions are possible, without departing from the scope and spirit of the invention as recited in the accompanying claims.

What is claimed is:

1. A battery pack case adapted to enclose a protective circuit module and a bare cell, the case comprising:
    at least one small opening arranged on a side to expose an external terminal of the protective circuit module;
    a large opening arranged in the opposite direction to the small opening to expose a surface of the bare cell; and
    a plurality of gate traces arranged above and below the small opening in which an upper and lower gate traces of said plurality of gate traces are positioned on different straight lines in a vertical direction in a zigzag pattern.

2. The battery pack case as claimed in claim 1, further comprising:

long-sided regions spaced apart from each other;

short-sided regions arranged on edges of the long-sided regions while being spaced apart from each other; and an upper-sided region arranged on common edges of the long-sided regions and the short-sided regions, the small opening being arranged in the upper-sided region.

3. The battery pack case as claimed in claim 2, wherein the interface between the long-sided regions and the short-sided regions is rounded.

4. The battery pack case as claimed in claim 2, wherein the interface between the long-sided regions and the short-sided regions is at a right angle.

5. The battery pack case as claimed in claim 1, wherein the case comprises an insulating resin.

6. The battery pack case as claimed in claim 1, wherein the case comprises one material chosen from a group consisting of PolyCarbonate (PC), PolyEthylene Terephthalate Glycol (PETG), PolyEthylene (PE), PolyPropylene (PP).

7. The battery pack case as claimed in claim 2, wherein the long-sided regions have a rougher surface than that of the short-sided regions.

\* \* \* \* \*

UNITED STATES PATENT AND TRADEMARK OFFICE
CERTIFICATE OF CORRECTION

PATENT NO. : 7,655,352 B2 Page 1 of 1
APPLICATION NO. : 11/232433
DATED : February 2, 2010
INVENTOR(S) : Heo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Twenty-third Day of November, 2010

David J. Kappos
*Director of the United States Patent and Trademark Office*